United States Patent [19]

Knight

[11] Patent Number: 5,336,554
[45] Date of Patent: Aug. 9, 1994

[54] STRETCHABLE TEAR RESISTANT POROUS ELASTOMERIC FILM ELEMENTS AND PROCESSES

[76] Inventor: David Knight, 196 Brushy Hill Rd., Newtown, Conn. 06470-0124

[21] Appl. No.: 62,826

[22] Filed: May 14, 1993

[51] Int. Cl.$^5$ .................. B23K 26/00; B65B 33/01
[52] U.S. Cl. .................... 428/230; 428/231; 428/304.4; 219/121.7; 219/121.71; 219/121.76
[58] Field of Search .............. 428/230, 231, 313.3, 428/313.5, 315.5, 304.4; 219/121.7, 121.71, 121.76

[56] References Cited

U.S. PATENT DOCUMENTS

| | | | |
|---|---|---|---|
| 3,226,527 | 12/1965 | Harding | 219/121.71 X |
| 3,617,702 | 11/1971 | Flournoy | 219/384 |
| 4,023,743 | 6/1977 | Erbach et al. | 219/121 LM |
| 4,028,525 | 6/1977 | Mominee et al. | 219/121 L |
| 4,218,606 | 8/1980 | Whitman, III | 219/121 L |
| 4,537,809 | 8/1985 | Ang et al. | 428/169 X |
| 4,672,168 | 6/1987 | Saunders et al. | 219/121 LK |
| 4,743,123 | 5/1988 | Legters et al. | 383/103 |

*Primary Examiner*—Daniel Zirker
*Attorney, Agent, or Firm*—Perman & Green

[57] ABSTRACT

Process for providing thin elastomeric sheet elements with air-permeability and with improved resistance to tearing as a result of being punctured while in stretched condition. The process comprises exposing the sheet to interrupted, high intensity, narrow laser beams to form a plurality of small, closely-spaced laser perforations, each having smooth walls which resist tearing.

5 Claims, No Drawings

STRETCHABLE TEAR RESISTANT POROUS ELASTOMERIC FILM ELEMENTS AND PROCESSES

BACKGROUND OF THE INVENTION

1. Field of the Invention

The present invention relates to the production of novel stretchable elastomeric film elements which are rendered porous so as to have breathing properties but which also are provided with improved resistance to tearing if punctured while under the stress of being stretched during use.

Stretchable elastomeric films, such as of natural polymeric materials including natural rubber latex and synthetic polymeric materials including butadiene-styrene rubbers, isoprenes and a wide variety of other known elastomers, are well known for use in various applications where porosity is imparted in order to render the films air-permeable or breathable. Most such applications relate to the use of the stretchable films as garments or protective or therapeutic coverings for parts of the human body, such as girdles, swim caps, scuba garments, compressive medical cast coverings, bandages, diaper components, etc. An elastomer is a material which can be stretched at room temperature to at least twice its original length, held for 5 minutes and, upon release, will return to within 10% of its original length within 5 minutes.

2. Discussion of the Prior Art

Conventionally, stretchable elastomeric films have been rendered air-permeable or breathable by mechanical die cutting, punching or perforating machines having circular cutting elements, dies or punchers of predetermined diameter and spacing which cut through the elastomeric films to remove portions thereof and produce air-permeable holes having the desired diameter and spacing.

While such mechanically-cut holes or perforations impart the desired air-permeability and breathing properties to the elastomeric film materials, they have the disadvantage of substantially increasing the tendency of the elastomeric film to tear each time that the film is stretched, such as during application and removal of a garment. Applicant has discovered that such weakness of the perforated elastomeric film is due to the inherent formation of minute irregularities, cuts, tears or abrasions on the walls of the air passages or holes punched through the elastomeric film. While such irregularities generally are not visible to the unaided eye and do not detract from the appearance or breathing properties of the elastomeric film, they represent a plurality of weakness points when the elastomeric film is stretched or elongated to several times its static length and/or width, particularly with high localized finger pressure and/or finger nail pressure. When the stretched film tears at one perforation the tear quickly propagates through adjacent perforations since each perforation has wall weaknesses.

It is known to form perforations in a variety of materials, such as paper, plastic conduits and plastic films, by means of high intensity laser devices to control the porosity of the materials. Reference is made to U.S. Pat. Nos. 3,226,527; 3,617,702; 4,028,525; 4,032,743; 4,218,606; 4,672,168 and 4,743,123 for their disclosures of conventional laser perforation devices and their use for forming laser perforations in a variety of materials, including thin plastic films. None of these references disclose the formation of perforations in stretchable elastomeric films or the formation of laser-perforated plastic films which are more resistant to tearing than corresponding films which are mechanically-perforated.

SUMMARY OF THE INVENTION

The present invention relates to the production of perforated stretchable elastomeric films having improved resistance to tearing while in stretched condition, and is characterized by the fact that the perforations are formed by laser-evaporation of thermoplastic elastomer material, rather than mechanical punching thereof, to form a multiplicity of perforations each having smooth, fused walls free of imperfections which represent weakness points when the film is stressed during stretching.

Applicant has discovered that the use of mechanical punching means to form perforations in stretchable thermoplastic elastomeric films produces minute imperfections in the walls of the perforations which, while they have no adverse effects in the case of paper, pvc conduit and non-stretchable plastic films such as polyethylene, pvc, Mylar and the like, such imperfections represent weakness points when present in perforations in stretchable elastomeric films which are subjected to frequent stretching during use. Applicant has further discovered that the tear resistance of perforated elastomeric films can be substantially improved or increased by forming the necessary perforations by means of high intensity laser devices, whereby the elastomeric film material is vaporized and evaporated from the film in the treated areas to produce perforations having smooth fused walls free of imperfections representing weakness points which can cause the perforated elastomeric film to tear when the film is stretched.

DETAILED DESCRIPTION

The present invention relates to the production of laser-perforated thin elastomeric films having improved resistance to tearing when stretched. Such materials are ideally suited for many industrial, medical, athletic and fashion uses in which the elastomeric films are stretched and exposed to possible puncture during use.

The present elastomeric films or sheets may consist of natural elastomers such as rubber latex or synthetic elastomers such as butadiene-styrene polymers and copolymers, polybutadiene, polyisoprene, butyl rubber, neoprene, nitrile rubber, and other film-forming elastomers. In general the thickness of the present films range between about ½ mil (0.0005 inch) and one hundred twenty-five mils (about 0.125 inch) depending upon the end use to which the film is to be put. Most commonly the present films have a thickness between about 5 and 50 mils (0.005 to 0.05 inch).

The size and density of the perforations in the present elastomeric films is variable within wide limits depending upon the thickness of the film and the desired degree of air permeability. Generally the diameter of the perforations will range between about 0.002 and 0.06 inch and will be spaced from each other by a distance of at least about 0.04 inch. Typically a perforated elastomeric film or sheet according to the present invention, such as a natural latex rubber film or sheet having a thickness of about ½ millimeter (0.02 inch) will contain between 100 and 500 holes per square inch, preferably about 250 holes per square inch, on at least certain areas thereof.

The present elastomeric films are perforated by means of a conventional high intensity laser apparatus designed to convey a flexible plastic film strip or web through an adjustable laser-exposure station to produce a plurality of spaced holes and adjacent columns of such holes, each hole having the predetermined diameter and spacing. Suitable laser devices are illustrated by U.S. Pat. Nos. 3,226,527; 4,218,606 and 4,672,168, the disclosures of which are hereby incorporated herein by reference thereto.

The unexpected, unobvious advantages of the present invention are clearly demonstrated by a comparison of the tear-resistance properties of 0.21 inch thick elastomeric sheets of natural rubber latex which are identical except that sheet A is not perforated, sheet B is mechanically perforated with 0.02 inch diameter holes, about 250 per square inch, and sheet C is laser-perforated with 0.02 inch diameter holes, about 250 per square inch.

The test method used is patterned after a standard test method for puncture-propagation tear resistance of plastic film and thin sheeting, ASTM Designation D2582 (Reapproved 1984). The standard test measures the resistance of a sheet material to snagging, or more precisely, to dynamic puncture and propagation of that puncture resulting in a tear.

Identical strips of each of the sheets A, B and C were stretched or elongated 100% and then cut with a blade tip at their centers. The unperforated sheet A immediately split or tore into two pieces. The mechanically-perforated sheet B also split or tore into two pieces, but more gradually than the unperforated sheet, as the tear line progressed from one perforation to the next. The laser-perforated elastomer sheet C did not split or tear into two strips. The cut at the center of the strip C progressed only to the nearest laser perforations at each side of the cut and stopped. The laser perforations into which the cut progressed became terminal ends for the cut line, which terminal ends have smooth, defect-free, walls which stretch but do not break under the tension of 100% elongation.

Thus, even if the present elastomeric sheets or films are punctured while subjected to stretching or elongation, as might commonly occur if the fingernails puncture a girdle, rubber glove, swim cap or medical cast sleeve or tube when the sheet or film is stretched during manual application, the elastomeric item will not tear and be destroyed for its intended purpose. The puncture will be confined within a small area and will be substantially undetectable when the stretching force is relaxed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A stretchable, tear-resistant porous elastomeric film element comprising a film of natural or synthetic elastomeric composition which has a thickness of up to about 0.125 inch and which can be stretched at room temperature to at least twice its original length, held for 5 minutes and, upon release, will return to within 10% of its original length within 5 minutes, said film being provided with a sufficient plurality of laser-perforations to impart the desired degree of air-permeability thereto, said perforations having an average maximum diameter of about 0.06 inch, and having smooth, fused walls free of imperfections which represent weakness points when the film is stressed during stretching.

2. A film element according to claim 1 comprising a thin film of natural rubber having a thickness of up to about 50 mils.

3. A film element according to claim 1 containing between about 100 and 500 holes per square inch on at least certain areas thereof.

4. A film element according to claim 3 comprising a thin film of natural rubber having a thickness between about 5 and 50 mils, said film containing perforations between about 0.002 and 0.06 inch in diameter.

5. A film element according to claim 1 in which said perforations are spaced from each other by at least about 0.04 inch.

* * * * *